US005497618A

United States Patent [19]
Brailsford et al.

[11] Patent Number: 5,497,618
[45] Date of Patent: Mar. 12, 1996

[54] AIR/FUEL CONTROL SYSTEM WITH CATALYTIC CONVERTER MONITORING

[75] Inventors: Alan D. Brailsford, Dearborn; Douglas R. Hamburg, Bloomfield Hills; Eleftherios M. Logothetis, Birmingham; Mohammed Yussouff, Lincoln Park, all of Mich.

[73] Assignee: Ford Motor Company, Dearborn, Mich.

[21] Appl. No.: 315,737

[22] Filed: Sep. 30, 1994

[51] Int. Cl.⁶ .................................................... F01N 3/20
[52] U.S. Cl. .............................. 60/274; 60/276; 60/277
[58] Field of Search .............................. 60/274, 277, 276

[56] References Cited

U.S. PATENT DOCUMENTS

| | | | |
|---|---|---|---|
| 5,099,647 | 3/1992 | Hamburg | 60/277 |
| 5,268,086 | 12/1993 | Hamburg et al. | 204/429 |
| 5,313,791 | 5/1994 | Hamburg | 60/276 |
| 5,363,091 | 11/1994 | Kotwicki | 60/276 |
| 5,375,413 | 12/1994 | Hamburg | 60/276 |

*Primary Examiner*—Douglas Hart
*Attorney, Agent, or Firm*—Allan J. Lippa; Roger L. May

[57] ABSTRACT

A control system and method maintains engine air/fuel operation near stoichiometry (104–178) in response to exhaust gas oxygen sensors (44,52) positioned both upstream and downstream of a catalytic converter (50). A non-catalytic exhaust gas oxygen sensor (54), having non-catalytic electrode, is positioned downstream of the converter (50) and its output voltage (Vo) monitored. Pumping current (Ip) is applied to an electrode of the non-catalytic sensor at a predetermined magnitude (IPREF) from a pumping current generator (56). When the output voltage (Vo) is detected at a predetermined high voltage range (302–318) an indication of degraded converter efficiency is provided (320).

14 Claims, 3 Drawing Sheets

5,497,618

1

AIR/FUEL CONTROL SYSTEM WITH CATALYTIC CONVERTER MONITORING

FIELD OF THE INVENTION

The field of the invention relates to controlling engine air/fuel ratio while concurrently monitoring the efficiency of a catalytic converter coupled to the engine's exhaust.

BACKGROUND OF THE INVENTION

U.S. Pat. No. 5,268,086 discloses an air/fuel control system responsive to feedback signals derived from exhaust gas oxygen sensors positioned both upstream and downstream of a catalytic converter. Each sensor has a catalytic electrode positioned in the engine exhaust. During a converter efficiency test cycle, air/fuel control proceeds with a third exhaust gas oxygen sensor having a non-catalytic electrode positioned in the engine exhaust downstream of the catalytic converter substituted for the catalytic sensor. Output signals are then compared for operation in which the catalytic sensor is utilized for feedback operation and the non-catalytic sensor is utilized to provide an indication of degraded converter efficiency.

The inventors herein have recognized numerous problems with the above approaches. One problem is that during the test cycle, when the non-catalytic sensor is substituted in the air/fuel control feedback loop, the average air/fuel ratio may operate lean of stoichiometry, resulting in increased emissions. Such operation occurs because the non-catalytic sensor output will shift towards leaner air/fuel ratios when exhaust gases are not fully equilibrated such as may occur with aging or other degradation of the converter.

SUMMARY OF THE INVENTION

An object of the invention herein is to provide accurate monitoring of catalytic converter efficiency while concurrently maintaining engine air/fuel control at stoichiometry or within the efficiency window of a catalytic converter. The above object is achieved, and problems of prior approaches overcome, by providing both a control system and method for maintaining engine air/fuel ratio within the efficiency window of a catalytic converter and concurrently monitoring the converter's efficiency. In one particular aspect of the invention, the method comprises the steps of: adjusting fuel delivered to the engine in response to a feedback variable derived from a first exhaust gas oxygen sensor to maintain the engine air/fuel ratio within the converter's efficiency window; pumping current into one electrode of a second exhaust gas oxygen sensor having a non-catalytic exhaust-side electrode during a test cycle; and monitoring output amplitude of the second sensor during the test cycle to provide an indication of the converter's efficiency.

An advantage of the above aspect of the invention is that accurate catalytic converter monitoring is provided without disturbing engine air/fuel operation such that engine air/fuel operation is maintained at stoichiometry within the converter's efficiency window.

In another aspect of the invention, the control system comprises: a first exhaust gas oxygen sensor coupled to the engine exhaust upstream of the converter; an air/fuel controller adjusting fuel delivered to the engine in response to a feedback variable derived at least in part from the first exhaust gas oxygen sensor to maintain the engine air/fuel ratio within the converter's efficiency window; a second exhaust gas oxygen sensor having a noncatalytic exhaust-

2 side electrode; a circuit for pumping current into one of the electrodes of the second sensor during a test cycle; and a monitoring controller monitoring read-only memory 18; random access memory 20; keep-alive memory 22; and a conventional data bus. Controller 10 is shown receiving various signals from sensors coupled to engine 28 including: measurement of inducted mass airflow (MAF) from mass airflow sensor 32; engine coolant temperature (T) from temperature sensor 40; indication of engine speed (rpm) from tachometer 42; output signal FEGO derived by conventional filtering and threshold comparison of the output from conventional exhaust gas oxygen sensor 44 having a catalytic exhaust-side electrode positioned in the engine exhaust upstream of catalytic converter 50; and signal REGO derived by conventional filtering and threshold comparison of the output from another conventional exhaust gas oxygen sensor (52) having a catalytic exhaust-side electrode positioned in the engine exhaust downstream of catalytic converter 50.

As described in greater detail later herein with particular reference to FIG. 4, exhaust gas oxygen sensor 54, having a non-catalytic exhaust-side electrode (shown as numeral 202 in FIG. 4) positioned in the engine exhaust downstream of converter 50 is shown having output signal Vo coupled to controller 10. Pumping current generator 56 is shown pumping current Ip to exhaust gas oxygen sensor 54 in response to voltage signal Vp from controller 10.

Intake manifold 68 of engine 28 is shown coupled to throttle body 70 having primary throttle plate 72 positioned therein. Throttle body 70 is also shown having fuel injector 76 coupled thereto for delivering liquid fuel in proportion to the pulse width of signal fpw from controller 10. Fuel is delivered to fuel injector 76 by a conventional fuel system including fuel tank 80, fuel pump 82, and fuel rail 84.

Other engine components and systems such as an ignition system and exhaust gas recirculation system are not shown because they are well known to those skilled in the art. Although a central fuel injection system is the output amplitude of the second sensor during the test cycle to provide an indication of the converter's efficiency.

Preferably, a third exhaust gas oxygen sensor is coupled to the engine exhaust downstream of the converter and the air/fuel controller is further responsive to the third sensor. In addition, both the first and third sensors preferably have a catalytic electrode positioned in the engine exhaust.

An advantage of the above aspect of the invention is that accurate catalytic converter monitoring is provided without disturbing engine air/fuel operation such that engine air/fuel operation is maintained at stoichiometry within the converter's efficiency window.

BRIEF DESCRIPTION OF THE DRAWINGS

The above object and advantages of the invention will be more clearly understood by reading an example of an embodiment in which the invention is used to advantage with reference to the attached drawings wherein.

DESCRIPTION OF AN EMBODIMENT

Figure 1:
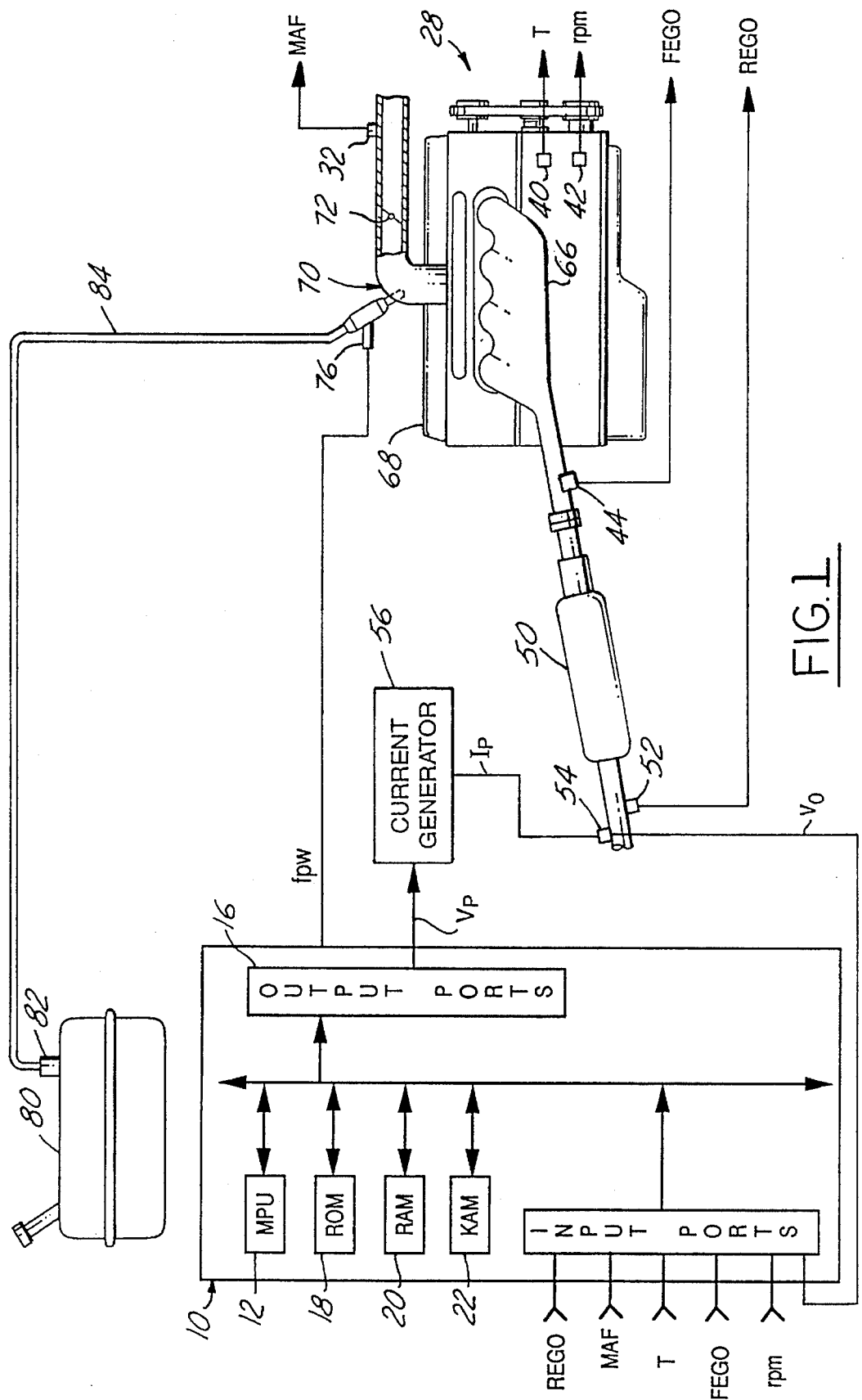
FIG. 1 is a block diagram of an embodiment where the invention is used to advantage.

Controller 10 is shown in the block diagram of FIG. 1 as a conventional microcomputer including: microprocessor unit 12; input ports 14; output ports 16; shown, the invention claimed herein may be used to advantage with other types of systems such as sequential fuel injection or carbureted systems. Those skilled in the art will also recognize that the invention claimed herein is applicable to other engine control configurations such as "stereo" control systems wherein the fuel injectors for each bank are controlled by a separate exhaust gas oxygen sensor positioned in each of the exhaust manifolds in engines having a "V" configuration. The invention is also applicable to air/fuel control systems responsive to a single exhaust gas oxygen sensor positioned either upstream or downstream of the catalytic converter.

Figure 2:
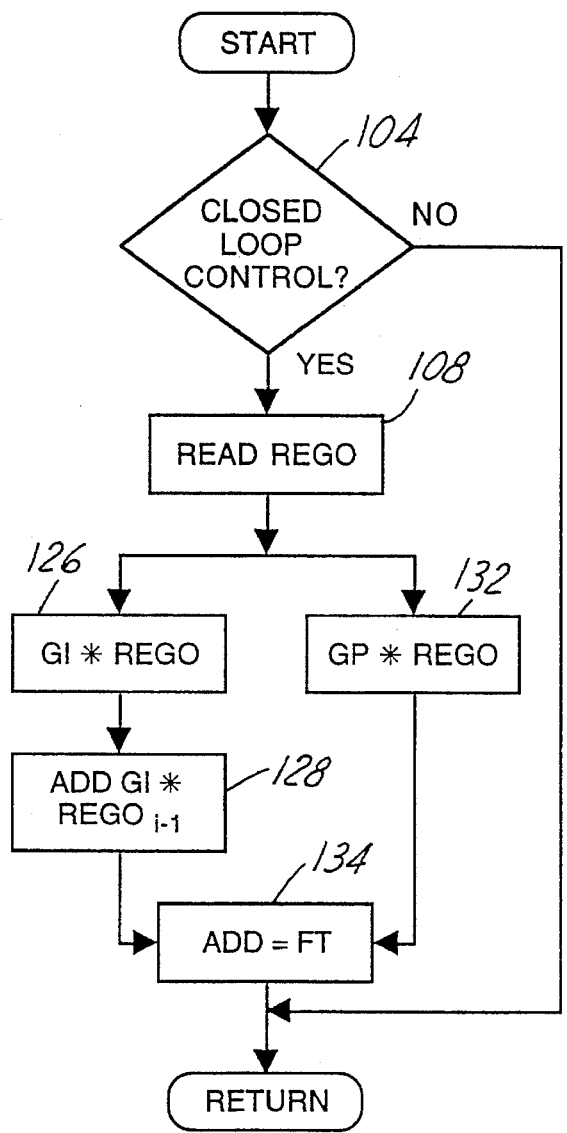
FIGS. 2-3 are high level flowcharts of various operations performed by a portion of the embodiment shown in FIG. 1.

Referring now to FIG. 2, a flowchart of a routine performed by controller 10 to generate fuel trim signal FT is now described. In the particular example described herein, closed-loop air/fuel control is commenced (step 104) when engine temperature is within a predetermined range, the engine has been operating for at least a preselected time, and throttle position is within a preselected range. When closed-loop control commences, signal REGO is read (step 108), multiplied by gain constant GI (step 126), and the resulting product added to products previously accumulated (GI*REGO$_{i-1}$) in step 128. Stated another way, signal REGO is integrated each sample period (i) in steps determined by gain constant GI.

During step 132, signal REGO is multiplied by proportional gain GP. The integral value from step 128 is added to the proportional value from step 132 during addition step 134 to generate fuel trim signal FT.

Figure 3:
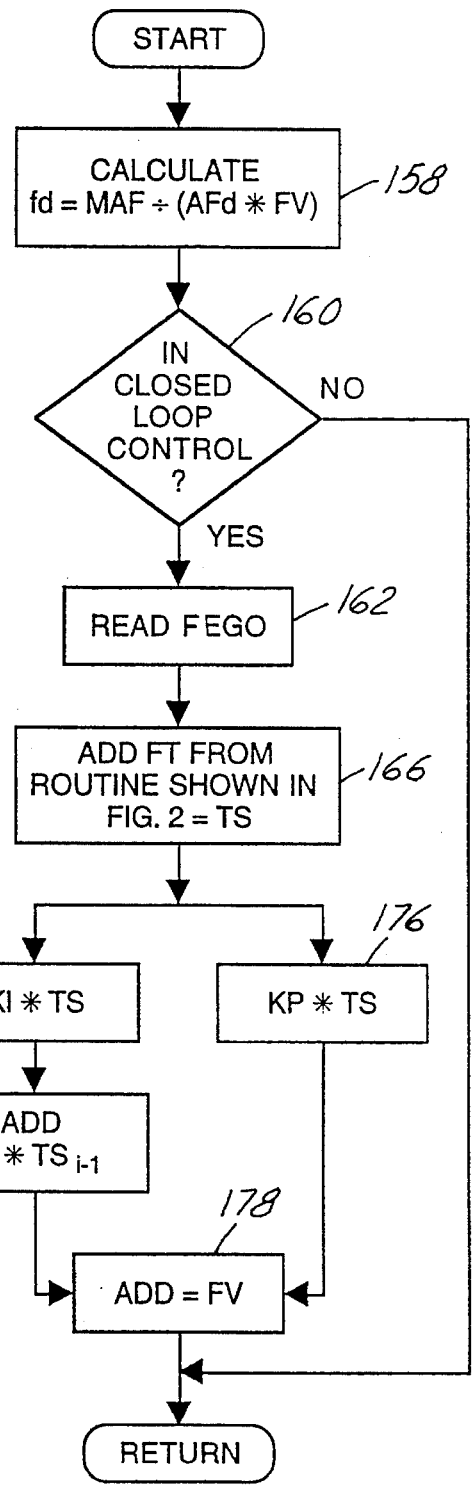

The routine executed by controller 10 to generate the desired quantity of liquid fuel delivered to engine 28 is now described with reference to FIG. 3. During step 158, an open-loop fuel quantity is first determined by dividing measurement of inducted mass airflow (MAF) by desired air/fuel ratio AFd which is typically the stoichiometric value for gasoline combustion. This open-loop fuel charge is then adjusted, in this example divided, by feedback variable FV which is generated as now described with respect to steps 160–178. It is to be understood that other conventional methods for generating an open loop fuel charge may be used to advantage. For example, speed density systems are well known in which airflow is deduced from manifold vacuum pressure and engine speed. Air volume measurements may also be used to advantage.

After determining that closed-loop air/fuel control is desired (step 160), by monitoring engine operating conditions such as those previously described herein with reference to step 104 in FIG. 2, signal FEGO is read during step 162. Signal FEGO is then trimmed (in this example by addition) by trim signal FT which is transferred from the routine previously described with reference to FIG. 2 to generate trimmed signal TS. The product of integral gain value KI times trimmed signal TS (step 170) is generated and added to the previously accumulated products (step 172). That is, trimmed signal TS is integrated in steps determined by gain constant KI each sample period (i) during step 172. A product of proportional gain KP times trimmed signal TS (step 176) is then added to the integration of KI * TS during step 178 to generate feedback variable FV.

Alternatively, the process described above with particular reference to FIG. 3 may be performed by biasing signal FV, rather than trimming signal FEGO, with fuel trim signal FT.

In one such alternative embodiment, two proportional gain constants (KP$_1$ and KP$_2$) are used to advantage. Proportional gain KP$_1$ multiplies signal FEGO when it switches from a lean to a rich indicating state and proportional gain KP$_2$ multiplies signal FEGO when it switches from a rich to a lean state. Proportional term KP$_1$ is incremented when fuel trim signal FT indicates a lean bias is desired and proportional term KP$_1$ is decreased (or KP$_2$ incremented) when a rich bias is desired by fuel trim signal FT.

Figure 4:
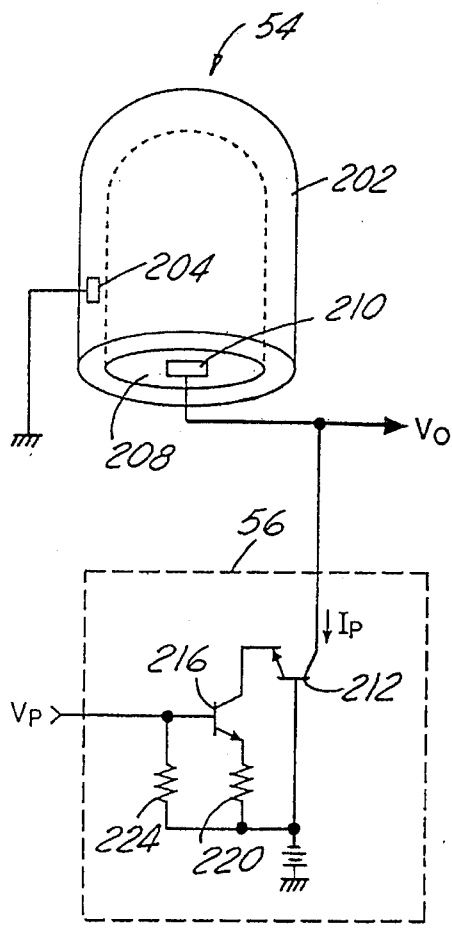
FIG. 4 discloses a current pumping circuit coupled to an electrode of the non-catalytic exhaust gas oxygen sensor described herein.

Referring now to FIG. 4, a perspective sectional view of exhaust gas oxygen sensor 54 is shown having non-catalytic electrode 202 positioned on its outer surface. Electrode lead 204 is shown coupled between non-catalytic electrode 202 and signal ground. Non-catalytic electrode 202 communicates with the engine exhaust downstream of converter 50 as previously described herein. A second electrode (208) (either catalytic or non-catalytic) is shown positioned on the inner surface of exhaust gas oxygen sensor 54 for communication with ambient air to provide a reference value. Electrode lead 210 is shown coupled to non-catalytic electrode 208 for providing output voltage Vo to controller 10 and for providing electrical connection to pumping current generator 56.

Pumping current generator 56 is shown having the collector terminal of transistor 212 coupled to electrode lead 210 for pumping current Ip thereto. The base of transistor 212 is shown coupled to signal ground and the emitter of transistor 212 is shown coupled to the collector terminal of transistor 216. Resistor 220 is shown coupled in series between the emitter terminal of transistor 216 and signal ground. Resistor 224 is shown coupled between the base terminal of transistor 216 and signal ground. Voltage signal Vp is coupled to the base terminal of transistor 216 by controller 10.

In operation, when controller 10 provides voltage Vp at a sufficient level, transistor 216 is turned on thereby turning on transistor 212 and drawing current Ip, at a preselected value, through resistor 220.

In normal operation without pumping current Ip being applied, exhaust gas oxygen sensor 54 provides output voltage amplitude (Vo) at a first voltage range when exhaust gases are rich of a predetermined air/fuel ratio. When exhaust gases are lean of this predetermined air/fuel ratio, output voltage amplitude Vo transitions or step, to a low voltage range. By applying pumping current Ip to exhaust gas oxygen sensor 54 such that the current flows out of the air-reference electrode, the predetermined air/fuel ratio at which the voltage transition occurs will shift towards a richer air/fuel ratio by a preselected amount corresponding to the magnitude of pumping current Ip applied.

Figure 5:
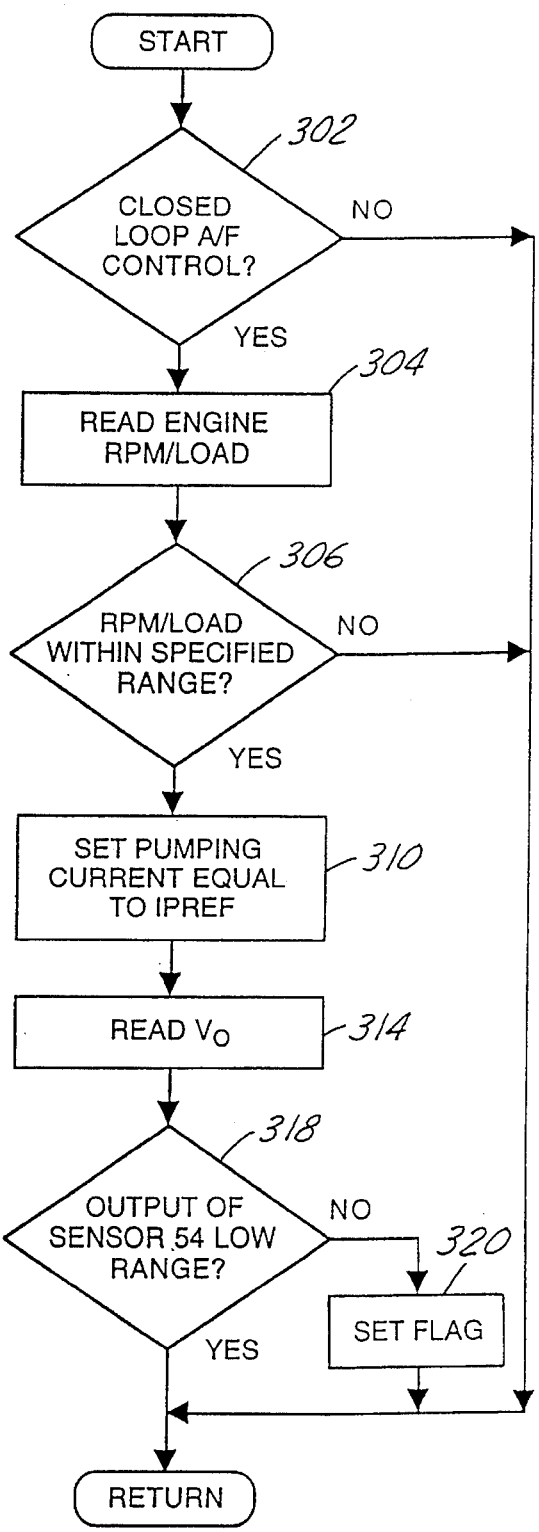
FIG. 5 is a high level flowchart of various operations performed by a portion of the embodiment shown in FIG. 1.

Referring now to the flowchart shown in FIG. 5, monitoring the efficiency of catalytic converter 50 by application of pumping current Ip is described. The subroutine is executed after a determination is made that closed loop air/fuel control is operable (step 302). Engine rpm and load are then read during step 304 and compared to a specified range in step 306.

If engine speed and load are within a specified range, and engine air/fuel control is operating in the feedback mode, controller 10 commences a test cycle by applying voltage Vp to pumping current generator 56 such that pumping current Ip is provided at preselected value IPREF (step 310). As previously described herein with particular reference to FIG. 4, pumping current Ip, at preselected value IPREF, will shift the output transition or step change of exhaust gas oxygen sensor 54 towards a richer air/fuel ratio by a preselected amount ($\Delta A$).

When the converter 50 is new and highly efficient, the exhaust gases are at equilibrium downstream of converter 50 and the output transition or step change of sensor 54 is located very close to the stoichiometric air/fuel. As converter 50 ages, its efficiency degrades so that exhaust gases may no longer be at equilibrium downstream of converter 50. This causes a shift in the output transition or step change of exhaust gas oxygen sensor 54 towards a leaner air/fuel ratio. While converter 50 is operating within a desired efficiency range, the shift towards leaner air/fuel ratios of sensor 54 will be less than the shift in output step change of sensor 54 towards rich air/fuel ratios caused by pumping current IPREF. Accordingly, the step change in output of sensor 54 will be located at a value rich of stoichiometry so that its output voltage Vo will be at a low voltage range. However, when converter 50 ages sufficiently so that the resulting shift in the step change output of sensor 54 towards lean air/fuel ratios is greater than the opposing shift towards rich air/fuel ratios caused by pumping current IPREF, the step change in output of sensor 54 will be located at an air/fuel value lean of stoichiometry. And, its output voltage Vo will then be at a high voltage range.

In view of the above, when output voltage Vo is detected at a high voltage range (step 318), a flag is set (step 320) indicating degraded converter efficiency. On the other hand, when output voltage Vo is detected at a low voltage range, catalytic converter 50 is operating within an acceptable efficiency range and the subroutine exited (step 318).

An example of operation is presented herein wherein both upstream sensor 44 and downstream sensor 54 are two-state exhaust gas oxygen sensors. The invention claimed herein, however, may be used to advantage with other sensors such as proportional sensors. The invention may also be used to advantage with air/fuel feedback control responsive to a single exhaust gas oxygen sensor positioned either upstream or downstream of catalytic converter 50 or combinations of upstream and downstream exhaust gas oxygen sensor. Other modifications will become apparent to those skilled in the art without departing from the spirit and scope of the invention. Accordingly, it is intended that the scope of the invention be defined only by the following claims.

What is claimed:

1. A control system for maintaining engine air/fuel ratio within the efficiency window of a catalytic converter coupled to the engine exhaust and concurrently monitoring the converter's efficiency, comprising:

a first exhaust gas oxygen sensor coupled to the engine exhaust upstream of the converter;

an air/fuel controller adjusting fuel delivered to the engine in response to a feedback variable derived at least in part from said first exhaust gas oxygen sensor to maintain the engine air/fuel ratio within the converter's efficiency window;

a second exhaust gas oxygen sensor having a non-catalytic exhaust-side electrode;

a circuit for pumping current into one electrode of said second sensor during a test cycle; and a monitoring controller monitoring output amplitude of said second sensor during said test cycle to provide an indication of the converter's efficiency.

2. The control system recited in claim 1 wherein said circuit pumps a preselected amount of current during said test cycle.

3. The control system recited in claim 2 wherein said second sensor output has a first voltage range corresponding to the exhaust gases being rich of a predetermined air/fuel ratio and a second voltage range corresponding to the exhaust gases being lean of a said predetermined range.

4. The control system recited in claim 3 wherein said monitoring controller provides an indication of degraded converter efficiency in response to detection of said second voltage range.

5. The control system recited in claim 1 further comprising a third exhaust gas oxygen sensor coupled to the engine exhaust downstream of the converter and wherein said air/fuel controller is further responsive to said third sensor.

6. The control system recited in claim 5 wherein said first sensor and said third sensor each include catalytic electrodes.

7. The control system recited in claim 1 further comprising test means for generating said test cycle when the engine is operating in a preselected speed and load range.

8. The control system recited in claim 3 wherein said second sensor output amplitude transitions between said first voltage range and said second voltage range at a preselected exhaust gas air fuel ratio and said transition is shifted to an air/fuel ratio richer than said preselected air/fuel ratio by a preselected amount in response to said preselected pumping current.

9. A system for maintaining engine air/fuel ratio within the efficiency window of a catalytic converter coupled to the engine exhaust and concurrently monitoring the converter's efficiency, comprising:

a first exhaust gas oxygen sensor coupled to the engine exhaust upstream of the converter;

an air/fuel controller adjusting fuel delivered to the engine in response to a feedback variable derived at least in part by integrating an output of said first exhaust gas oxygen sensor to maintain the engine air/fuel ratio within the converter's efficiency window;

a second exhaust gas oxygen sensor having a non-catalytic exhaust-side electrode and an output amplitude having a first voltage range corresponding to the exhaust gases being rich of a predetermined air/fuel ratio and a second voltage range corresponding to the exhaust gases being lean of a said predetermined range;

a circuit for pumping current into one of said electrodes of said second sensor during a test cycle; and a monitoring controller monitoring output amplitude of said second sensor during said test cycle to provide an indication of the converter's efficiency when said first amplitude range is detected.

10. The control system recited in claim 9 wherein said second sensor output amplitude transitions between said first voltage range and said second voltage range at a preselected exhaust gas air fuel ratio and said transition is shifted to an air/fuel ratio richer than said preselected air/fuel ratio by a preselected amount in response to said preselected pumping current.

11. The control system recited in claim 9 wherein said circuit pumps a preselected amount of current during said test cycle.

12. A method to maintain engine air/fuel ratio within the efficiency window of a catalytic converter coupled to the engine exhaust and concurrently monitor the converter's efficiency, comprising the steps of:

adjusting fuel delivered to the engine in response to a feedback variable derived from a first exhaust gas oxygen sensor to maintain the engine air/fuel ratio within the converter's efficiency window;

pumping current into one electrode of a second exhaust gas oxygen sensor having a non-catalytic exhaust-side electrode during a test cycle; and monitoring output amplitude of said second sensor during said test cycle to provide an indication of the converter's efficiency.

13. The method recited in claim 12 wherein said monitoring step further comprises a step of indicating degraded converter efficiency when said output amplitude corresponds to an indication exhaust gases are rich of stoichiometry.

14. The method recited in claim 12 wherein said fuel adjusting step is further responsive to a third exhaust gas oxygen sensor positioned downstream of the converter.

* * * * *